C. E. HITE.
PRIMARY BATTERY.
APPLICATION FILED JULY 27, 1907.

1,024,577.

Patented Apr. 30, 1912.

WITNESSES:
Jas. C. Wobensmith
Mae Hofmann

INVENTOR
Charles E. Hite,
BY
Thos. Ewardale
ATTORNEY.

UNITED STATES PATENT OFFICE.

CHARLES E. HITE, OF BURLINGTON, NEW JERSEY.

PRIMARY BATTERY.

1,024,577.

Specification of Letters Patent.   Patented Apr. 30, 1912.

Application filed July 27, 1907. Serial No. 385,921.

*To all whom it may concern:*

Be it known that I, CHARLES E. HITE, a citizen of the United States, residing at Burlington, in the county of Burlington and State of New Jersey, have invented a new and useful Primary Battery, of which the following is a specification.

My invention relates to improvements in primary batteries.

The object of the invention is to provide means, in a two fluid cell, for separating the liquids without the intervention of an earthenware or other independent diaphragm. I cause the carbon electrode to act as a porous diaphragm, by sealing it into the vessel. By such an arrangement the difference in density, or osmotic action keeps the surface of the carbon, which is exposed to the electro-chemical line of activity directly opposite and near the zinc, always covered with a film of depolarizer. And also by keeping the carbon itself saturated with the depolarizer, great constancy is secured.

My invention also comprises means whereby I may tap one or more of the carbon plates, thus sealed into a vessel, for the purpose of taking two or more circuits from one battery at different potentials.

My invention also secures great economy in construction of a battery box or vessel, by sealing therein carbon porous diaphragm-electrode-plates, separated by non-porous non-conducting plates dividing the vessel into a number of separate cells.

Figure 1:
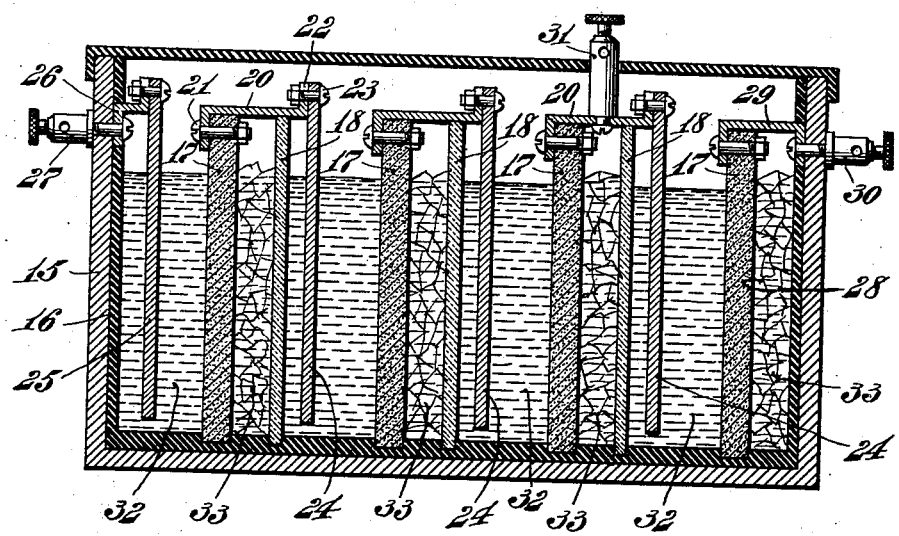
Figure 2:
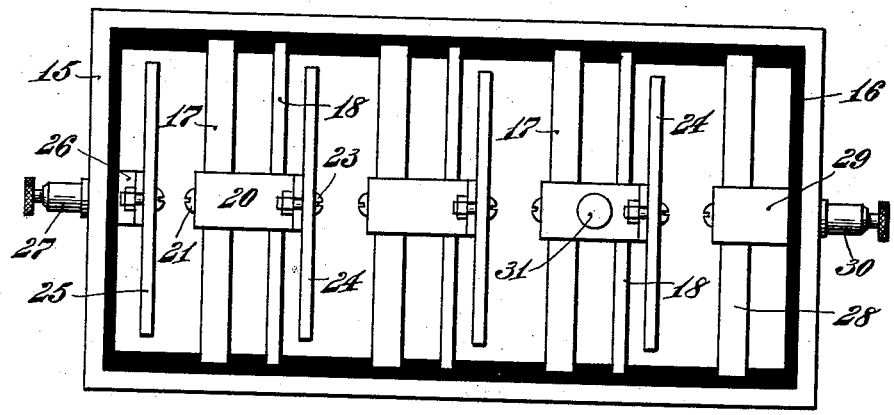
Figure 3:
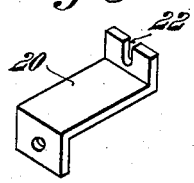

Referring to the drawings:—Figure 1 is a vertical section of a battery of several cells, embodying my invention. Fig. 2 is a plan view of same with lid removed. Fig. 3 is a perspective view of an aluminum connecting member.

Similar numerals refer to similar parts throughout the several views.

Referring to Figs. 1 and 2, 15 represents a receptacle or box made of wood or other suitable material, which is properly insulated on the inside by a coating 16 of pitch, varnish, hard rubber or other suitable material. The porous carbon plates or electrodes 17 are seated in channels formed in the sides and bottom of the box 15 and sealed therewith by the coating of pitch or varnish above mentioned. The insoluble and impervious plates 18 of glass or other suitable material, are similarly seated in channels formed in the sides and bottom of the box and sealed therewith. The several plates or partitions 18 form the box 15 into a plurality of liquid tight cells. In one of each of said cells is provided a carbon electrode 17 which divides the cell into two compartments. To each carbon electrode 17 except the terminal carbon, is secured the aluminum conducting member 20 by bolt 21 or other suitable means. The other end of said conducting member 20 is provided with an upwardly extending portion having a slot 22 adapted to receive the bolt 23 of the zinc electrode 24, so that said zinc electrode may be readily engaged therewith and disengaged therefrom. By which construction it will be seen the zinc electrode 24 is readily connected electrically with the carbon electrode, and supported by said member 20, but is also easily disengaged therefrom for purposes of renewal or the like. The zinc electrode 25, one of the terminal electrodes of the battery, is secured by the aluminum conducting member 26 to one of the terminal binding posts 27, while the terminal carbon electrode 28 is connected by the aluminum member 29 with the other terminal binding post 30.

The use of an aluminum connection between two electrodes of opposite polarity is thought to be new, especially in connection with a primary battery, and to have distinct utility. It is superior to a connection of other metal such as copper or brass, in that it is not subject to oxidation caused by the vapor arising from the bath.

One or more intermediate binding posts, such as 31, may be connected to one or more of the conducting members 20, so that two or more circuits may be taken from the battery at different potentials.

The compartment of each cell into which projects a zinc electrode is filled with a suitable electrolyte or excitant 32 such as sulfuric acid, while into the other compartment of each cell is filled the soluble crystal depolarizer 33, such as chromic acid. It will thus be seen that the electrolyte and soluble depolarizer of each cell are divided by a porous carbon electrode partition only; from which it results that the difference in density or osmotic action between the electrolyte and the depolarizer keeps the surface of the carbon, which is exposed to the electro-chemical line of activity, directly opposite and near the zinc always covered with a film of depolarizer; and also, by keeping the carbon itself saturated with the depolarizer, great constancy is secured, and by this means I entirely eliminate the earthenware or independent porous diaphragm heretofore used.

What I claim is:—

1. In a galvanic battery, the combination of a receptacle, a plurality of non-porous non-conducting partition plates permanently sealed into the sides and bottom of the receptacle forming a plurality of cells therein, porous carbon electrode plates sealed into the sides and bottom of said receptacle, one in each cell and dividing each cell into two compartments, a zinc electrode in one compartment of each cell, a slotted conducting and supporting member secured to a carbon electrode and disengageably connected with and supporting a zinc electrode in an adjacent cell.

2. In a galvanic battery, the combination of a receptacle, a plurality of non-porous non-conducting partition plates permanently sealed into the sides and bottom of the receptacle forming a plurality of cells therein, porous carbon electrode plates sealed into the sides and bottom of said receptacle, one in each cell and dividing each cell into two compartments, a zinc electrode in one compartment of each cell, a conducting and supporting member secured to a carbon electrode and connected with and supporting a zinc electrode in an adjacent cell, the said conducting and supporting member also resting upon and supported by a non-porous non-conducting partition plate.

3. In a galvanic battery, the combination of a receptacle, a plurality of non-porous non-conducting partition plates permanently sealed into the sides and bottom of the receptacle forming a plurality of cells therein, porous carbon electrode plates sealed into the sides and bottom of said receptacle, one in each cell and dividing each cell into two compartments, a zinc electrode in one compartment of each cell, a conducting and supporting member secured to a carbon electrode and connected with and supporting a zinc electrode in an adjacent cell, an electrolyte in the compartment containing the zinc electrode, and a soluble crystal depolarizer in the other compartment, as and for the purpose specified.

CHARLES E. HITE.

Witnesses:
MAE HOFMANN,
HOWARD S. OKIE.

---

Copies of this patent may be obtained for five cents each, by addressing the "Commissioner of Patents, Washington, D. C."